United States Patent
Mohler

(10) Patent No.: US 7,395,047 B2
(45) Date of Patent: Jul. 1, 2008

(54) ENHANCED EMERGENCY SYSTEM TELEPHONE FEATURE FOR PBX AND KEY SYSTEMS

(75) Inventor: Bridget M. Mohler, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 774 days.

(21) Appl. No.: 10/795,473

(22) Filed: Mar. 8, 2004

(65) Prior Publication Data
US 2005/0197097 A1 Sep. 8, 2005

(51) Int. Cl.
*H04M 11/04* (2006.01)
(52) U.S. Cl. .................. 455/404.2; 455/404.1; 379/37; 379/45
(58) Field of Classification Search ............. 455/404.2, 455/404.1; 379/37–39, 45, 93.17, 93.23, 379/93.07
See application file for complete search history.

(56) References Cited

U.S. PATENT DOCUMENTS

| 4,924,491 | A | 5/1990 | Compton et al. |
| 6,266,397 | B1 * | 7/2001 | Stoner ........................ 379/45 |
| 6,738,456 | B2 * | 5/2004 | Wrona et al. ................. 379/37 |
| 7,035,381 | B2 * | 4/2006 | D'Ascenzo et al. .......... 379/45 |
| 2002/0136358 | A1 | 9/2002 | Stumer et al. |
| 2002/0136360 | A1 | 9/2002 | Stumer et al. |
| 2003/0148757 | A1 | 8/2003 | Meer |
| 2005/0003797 | A1 * | 1/2005 | Baldwin .................. 455/404.1 |

FOREIGN PATENT DOCUMENTS

WO  WO 92/07439  4/1992

OTHER PUBLICATIONS

"On-Site 911," On-Site 911.com, http://www.pontech.com/products/pbx911/, pp. 1-4, no date.
"Data-Link provides the data you need to handle on-site 911 calls," Omnitronix DL12-9912-911, 1 page, no date.

* cited by examiner

*Primary Examiner*—Melur Ramakrishnaiah
(74) *Attorney, Agent, or Firm*—Yolanda Del Toro

(57) ABSTRACT

When an emergency call is made from a location on a premises that has on-premises (non-public) emergency-response personnel, the communications system responds by accessing a private database of information about the premises, retrieves therefrom information about the location of the physical location on the premises and best access to the physical location from off-premises, and sends this information to both the on-premises emergency-response personnel and a public emergency-response center, as well as connects the call to the public emergency-response center.

18 Claims, 2 Drawing Sheets

ENHANCED EMERGENCY SYSTEM TELEPHONE FEATURE FOR PBX AND KEY SYSTEMS

TECHNICAL FIELD

This invention relates to emergency communications systems and services.

BACKGROUND OF THE INVENTION

Public emergency communications systems are known to respond to the placing of an emergency call by retrieving database information identifying the physical location of the caller and providing this location information to the personnel who receive the emergency call. One such system is the US E-911 emergency telephone system, an illustrative example of which is described in U.S. Pat. No. 4,924,491.

Many organizations that have their own premises communications systems (e.g., a PBX or a key telephone system) have emergency-call policies that require employees to place on-premises emergency calls to the telephone number of the organization's local security personnel instead of to the public emergency number (e.g., 911). The security personnel in turn call the public emergency number after they have gathered information from the caller, and pass this and other information on to the public emergency personnel. The reason for such policies is that, when a call is placed to the public emergency number from the premises communications system, only the calling phone number and the central address associated with the premises system is made available to the public emergency personnel. But that central address may not be the location of the calling number; for example, it may be a home-office location, a front-office location, or a security-office location of the organization. Thus, the public-emergency personnel may be misdirected when responding to the call. Requiring the emergency call to be made to the organization's security personnel enables the security personnel to determine the exact location of the caller and then direct the public emergency personnel to the appropriate building, entrance, floor, etc., in other words, to the exact location where the emergency is occurring. The unfortunate and serious downside of this policy is that the sequential calling which it engenders adds delay to the response time of the emergency crew, which can endanger both lives and property.

SUMMARY OF THE INVENTION

This invention is directed to solving these and other problems of the prior art. According to the invention, when a single (i.e., one) communication is placed to a public emergency-response center from a physical location that has non-public emergency-response personnel associated with the location—such as a premises with on-site security or medical emergency response (MER) personnel, for example,—information about the location is retrieved from a private database—one that is inaccessible to the public emergency-response center—and is provided to both the public emergency-response center and the emergency-response personnel associated with the location. Thus, a single emergency call is sufficient to notify both the local emergency-response personnel and the public emergency-response center of the emergency and to provide both with the non-public information about the location, such as information about where the physical location is located on the premises and best access to the physical location from off-premises. The response-time delay associated with the prior art is thus eliminated.

The invention includes both a method as well as a corresponding apparatus for performing the method, and a computer-readable medium that contains instructions which, when executed in a computer, cause the computer to perform the method. The apparatus preferably includes an effector—any entity that effects the corresponding steps, unlike a means—for each method step.

BRIEF DESCRIPTION OF THE DRAWING

These and other features and advantages of the invention will become apparent from the following description of an illustrative embodiment of the invention considered together with the drawing, in which.

DETAILED DESCRIPTION

Figure 1:
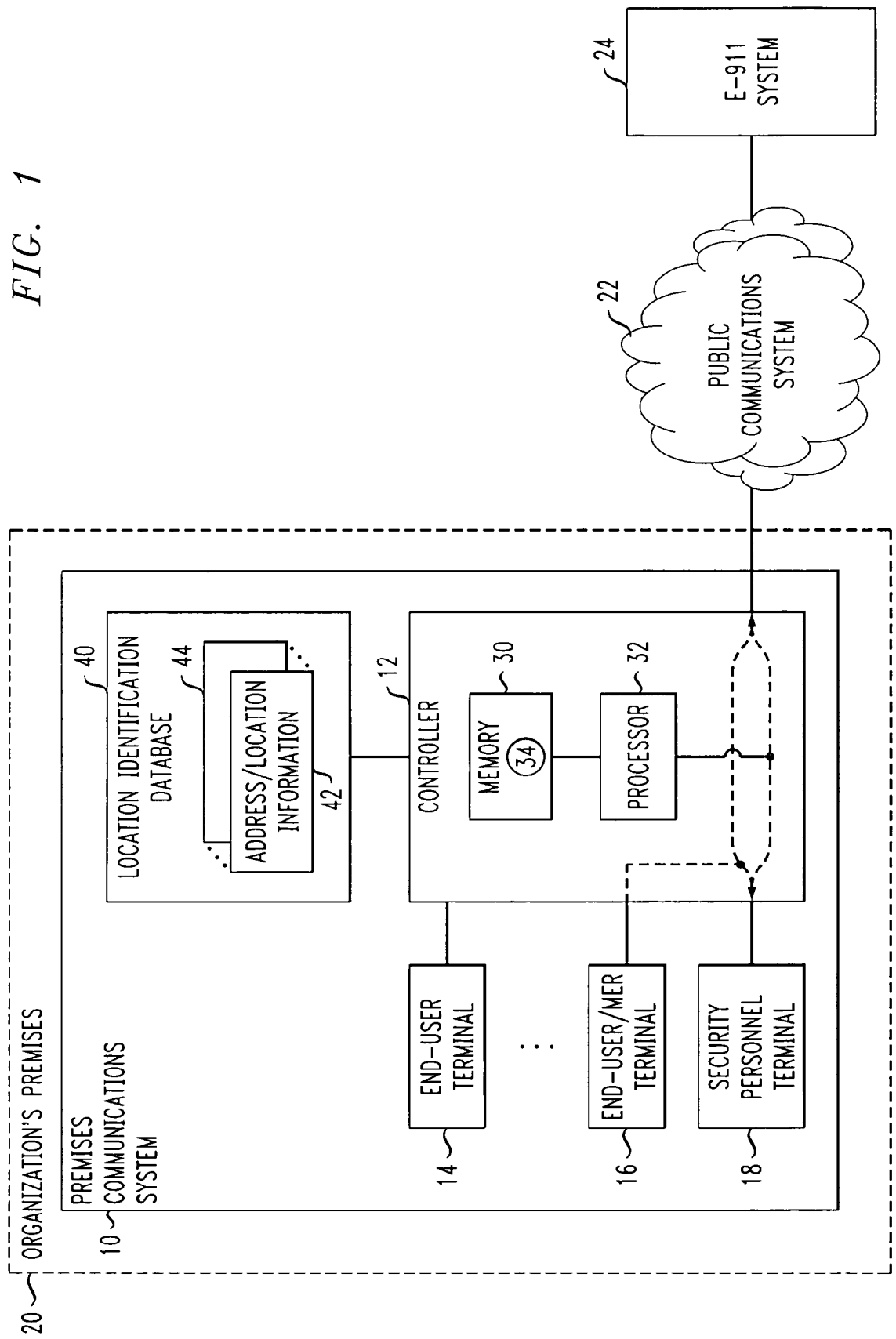
FIG. 1 is a block diagram of a communications system that includes an illustrative embodiment of the invention.

FIG. 1 shows a communications system comprising a premises communications system 10 serving premises 20 of an organization and connected for external communications to a public communications system 22 and therethrough to a public emergency communications (E-911) system 24. Premises communications system 10 comprises a plurality of end-user communications terminals 14-16 and one or more communications terminals 18 of local (e.g., on-premises 20) emergency-response personnel such as security personnel, interconnected with each other and with public communications system 22 by a controller 12. Premises communications system 10 may be any desired communication system. For example, it may be a telephone communications system where end-user terminals 14-16 are telephones or sensors, controller 12 is a switching system such as a PBX or a key-system switch, and security personnel terminal 18 is a display telephone. Or, it may be a data communications system where terminals 14-16 are computers or sensors, security personnel terminal 18 is a computer, and controller 12 is a gateway/router. Or, if may be a hybrid system where end-user terminals 14-16 are sensors, digital display phones, VoIP phones, or softphone-equipped computers, security personnel terminal 18 is a softphone-equipped computer, a display terminal, or a VoIP phone, and controller 12 is a multimedia PBX, an Internet gateway, and/or an intranet router. Other configurations may be envisioned by those skilled in the art.

Controller 12 is preferably a stored-program controlled machine comprising a memory 30 for storing programs and data, and a processor 32 for executing the programs and generating or using the data. Included among the programs stored in memory 30 is a program 34 that effects the functionality shown in FIG. 2. Controller 12 is also connected to a location-identification database 40. Database 40 stores location information 42-44 in association with the addresses (e.g., telephone numbers) of end-user terminals 14-16. Illustratively, the location information 42-44 for each terminal address includes the street address of the premises where the corresponding terminal 14-16 is located, the location of the premises entrance closest to the corresponding terminal 14-16, the floor, aisle, and office where the corresponding terminal 14-16 is located, and—if the terminal is associated with a particular user—the identify of that user. Additional information may be provided as well. The information may exist in any desirable form, e.g., merely as text, or in graphical form such as an annotated map. Database 40 is private (e.g., to the organization on premises 20) and is not accessible by a public E-911 system 24.

Figure 2:
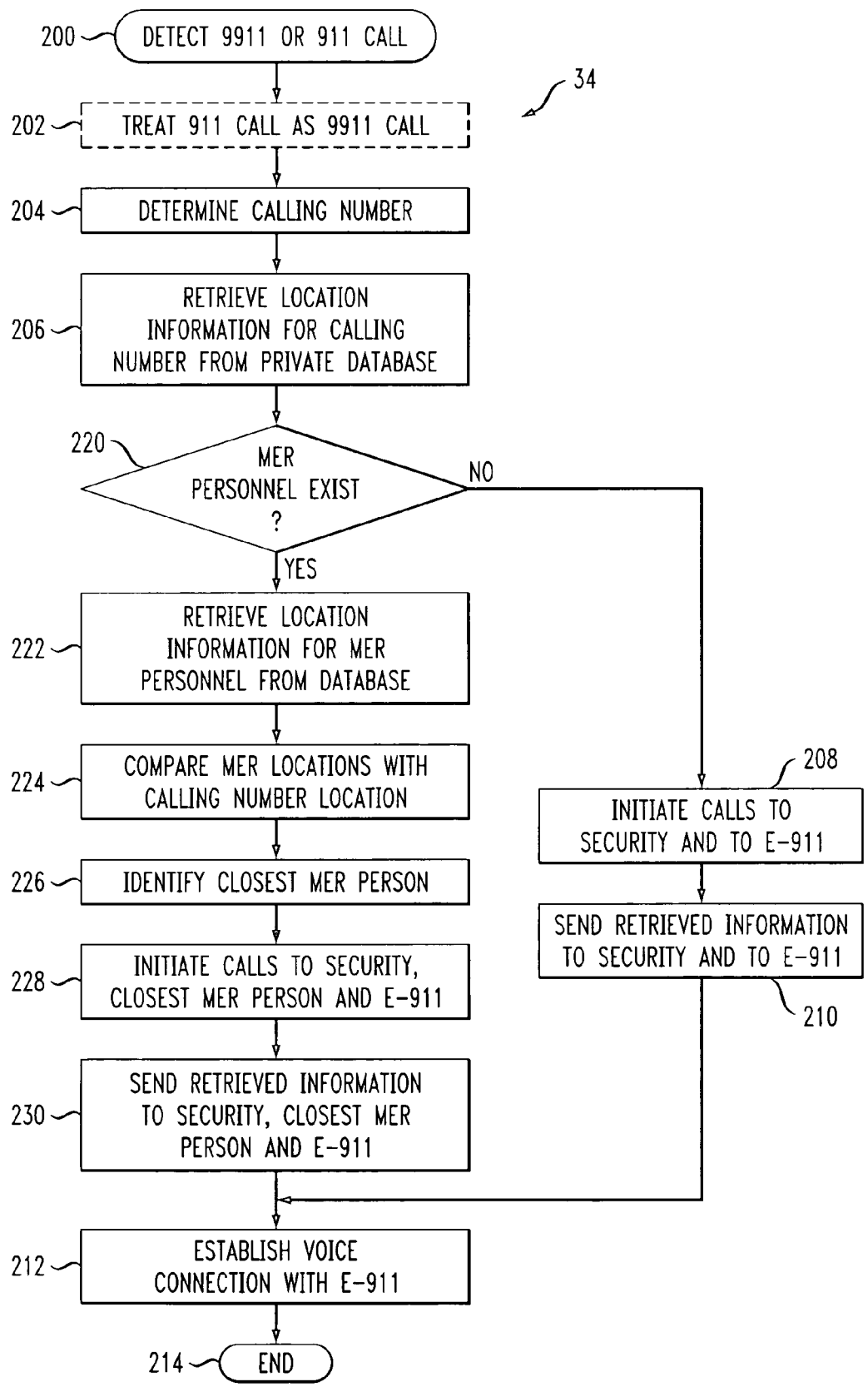
FIG. 2 is a flow diagram of functionality effected by a premises communications system of the system of FIG. 1.

FIG. 2 shows the functionality effected by controller 12 operating under control of program 34. The functionality is initiated when controller 12 detects an emergency communication from a terminal 14-16, at step 200. In the case of premises communications system 10 being a telephone system, the emergency communication would be a "911" or a "9911" call. To generate a "911" call to external E-911 system 24, a premises telephone system would generally require the caller to dial a "9" followed by "911." But to avoid the need to dial the extra "9," and the possible confusion caused thereby to the caller, system 10 preferably accepts both the "9911" and the "911" call and treats the "911" call as if it were a "9911" call, at step 202.

Processor 12 determines the address of the terminal from which the communication is originating—the calling number in the case of a telephone system 10—at step 204, and uses this number to retrieve the corresponding location information from database 40, at step 206. Optionally processor 12 then checks if there is on-premises medical emergency response (MER) personnel—usually volunteers spread among the population of premises 20—at step 220. If this option does not exist or if there is no on-premises MER personnel, processor 12 sends the location information that it retrieved at step 206 to both the E-911 system 24 and to security personnel terminal 18, at step 210. If premises communications system 10 is a data system, step 210 involves sending packets containing the retrieved information to both destinations. If premises communications system 10 is a telephone system, processor 12 initiates calls to both destinations, at step 208, and sends the retrieved information to both destinations, at step 210, illustratively as display information for a display terminal. Of course, conventional audio (voice) communications connections may—and likely will—also be established between the call originator and either the E-911 system or both the E-911 system and security personnel terminal 18, at step 214. Illustratively, the voice communication may be a conference call between the call-initiating terminal, system 24, and terminal 18; the connection to terminal 18 may optionally be a listen-only connection. Functionality relevant to this invention then ends, at step 214. Both local emergency (security) personnel associated with the location and public emergency personnel are thus provided with the detailed location information regarding where the emergency is taking place via a single communication to both security personnel terminal 18 and E-911 system 24, without the local emergency personnel having to make a separate subsequent call to the public E-911 system 24. Returning to step 220, if it is determined that there is on-premises MER personnel, processor 12 accesses database 40 and retrieves therefrom information on the location of those persons, at step 222, and compares this location information with the location information of the caller, at step 224, to determine the MER person who is closest to the caller, at step 226. Processor 12 then sends the location information on the location of the caller to the terminal (see terminal 16, in FIG. 1) closest MER person security personnel terminal 18, and the E-911 system 24, at steps 228-230. Sending of the information to the MER person is akin to sending it to security personnel terminal 18, as described in conjunction with steps 208-210. Operation of processor 12 then continues at step 212.

Of course various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A communications method comprising:
   placing a single communication by means of a communications system to a public emergency-response center from a physical location that has non-public emergency-response personnel associated with the location;
   in response to the single communication, the communications system causing information about the location to be retrieved from a database that is inaccessible to the public emergency-response center; and
   the communications system causing the retrieved information to be provided via the single communication to both the public emergency-response center and the emergency-response personnel associated with the location.

2. The method of claim 1 wherein:
   the physical location is located on a premises;
   the database contains information about the premises; and
   the retrieved information comprises information indicating location of the physical location on the premises.

3. The method of claim 2 wherein:
   the retrieved information further comprises information about access to the physical location from outside the premises.

4. The method of claim 1 wherein:
   causing the retrieved information to be provided via the single communication comprises
   the communication system establishing a communications connection for both audio communication and the information to the public emergency-response center, and establishing a communications connection for at least the information to a communications terminal of the emergency-response personnel associated with the location.

5. The method of claim 4 wherein:
   the communication comprises a telephone call.

6. The method of claim 4 wherein:
   the communication comprises an audio communication.

7. The method of claim 4 wherein:
   the communication comprises a data communication.

8. The method of claim 1 wherein the emergency response personnel associated with the location is at least one of on-premises security personnel and on-premises medical emergency response personnel.

9. An apparatus for performing the method of one of claims 1-7.

10. An apparatus comprising:
    a database of information about physical locations that have non-public emergency-response personnel associated with them, the database being inaccessible by a public emergency-response center; and
    a communications system responsive to a single communication being placed from one of the physical locations to the public emergency-response center by causing information about the one location to be retrieved from the database and provided via the single communication both to the public emergency-response center and the emergency-response personnel associated with the location.

11. The apparatus of claim 10 wherein:
    the physical locations are located on a premises; and
    the retrieved information comprises information indicating location of the one physical location on the premises.

12. The apparatus of claim 11 wherein:

the retrieved information further comprises information about access to the one physical location from outside of the premises.

13. The apparatus of claim 10 wherein:
the communication system is adapted to establish a communications connection for both audio communication and the information to the public emergency-response center and is adapted to establish a communications connection for at least the information to a communication terminal of the emergency-response personnel associated with the location.

14. The apparatus of claim 13 wherein:
the communication comprises a telephone call.

15. The apparatus of claim 13 wherein:
the communication comprises an audio communication.

16. The apparatus of claim 13 wherein:
the communication comprises a data communication.

17. An apparatus comprising:
means for placing a single communication to a public emergency-response center from a physical location that has non-public emergency-response personnel associated with the location;
means responsive to the single communication, for retrieving information about the location from a database that is inaccessible to the public emergency-response center; and
means for providing the retrieved information via the single communication to both the public emergency-response center and the emergency-response personnel associated with the location.

18. An apparatus comprising:
an effector of placing a single communication to a public emergency-response center from a physical location that has a non-public emergency-response personnel associated with the location;
an effector responsive to the single communication, of retrieving information about the location from a database that is inaccessible to the public emergency-response center; and
an effector of providing the retrieved information via the single communication to both the public emergency-response center and the emergency-response personnel associated with the location.

* * * * *